United States Patent Office 3,785,945

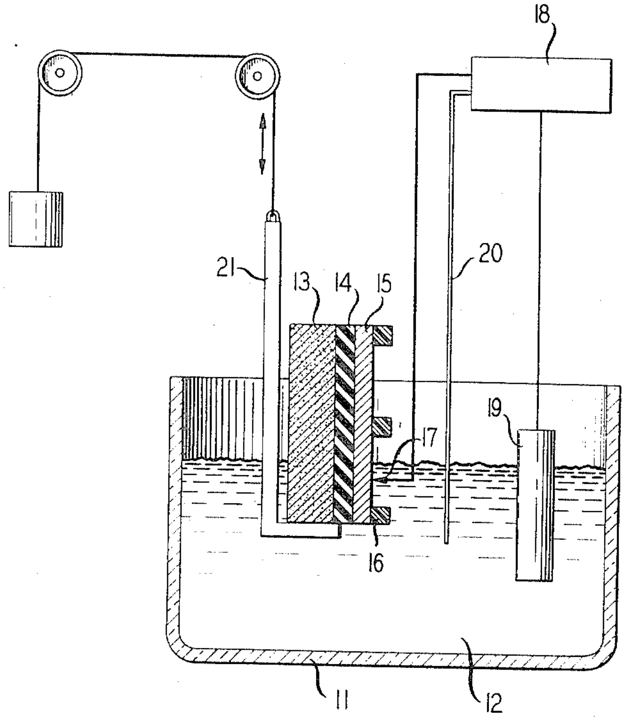
18
21
13
14
15
20
19
17
16
11
12

Patented Jan. 15, 1974

3,785,945

TECHNIQUE FOR ELECTROLYTICALLY ETCHING TUNGSTEN

Donald Morley MacArthur, Berkeley Heights, N.J., assignor to Bell Telephone Laboratories, Incorporated, Murray Hill and Berkeley Heights, N.J.

Filed May 4, 1972, Ser. No. 250,258

Int. Cl. C23b 3/00

U.S. Cl. 204—129.95 4 Claims

ABSTRACT OF THE DISCLOSURE

A technique for electrolytically etching tungsten films involves the use of borate phosphate and carbonate buffered electrolytes having a pH within the range of 7.0 to 10.5. The described process permits automation of the etching process and eliminates the formation of isolated islands of unetched materials.

This invention relates to a technique for electrolytically etching a tungsten film. More particularly, the present invention relates to a technique for electrolytic etching of tungsten films deposited upon insulating substrates.

DESCRIPTION OF THE PRIOR ART

In the fabrication of semiconductor integrated circuits, interconnections are commonly prepared by a processing sequence involving the deposition of an insulating layer upon a substrate surface, the formation of through-holes therein, deposition of a conductive film on the insulating layer and selective etching of the conductive film. The selective etching typically involves the use of a mask which corresponds with the desired pattern and an etching solution capable of attacking the film.

The acuity of definition of the pattern in the conductive film is, of course, limited by the ability of the masking layer to withstand the etching solution. Unfortunately, the use of relatively inert materials such as tungsten requires strong etchants which often attack or undercut the masking layer, so causing a loss in pattern resolution.

Recently, it was observed that tungsten films disposed on insulating substrates cannot be removed by conventional electrolytic etching techniques due to the fact that such techniques result in the formation of a plurality of isolated islands upon the insulating substrate. This difficulty was successfully obviated by the use of electrolytes which also manifest chemical etching action. The most commonly used etchants for this purpose are the alkaline ferricyanides. These etchants manifest an electrolytic etching rate substantially greater than their chemical etching rate and at the termination of electrolytic etching the chemical etching action removes the electrically isolated islands alluded to above. Although such systems have provided acceptable pattern definition, they suffer from the conventional limitations of the chemical etching systems in that a skilled operator is required to terminate etching. Additionally, batch processing introduces variations which require sampling each batch to determine optimum etching time. Accordingly, workers in the art have focused their interest upon overcoming these difficulties.

SUMMARY OF THE INVENTION

In accordance with the present invention these prior art limitations are effectively obviated by a novel etching system which permits automation of the patterning of tungsten films. Briefly, the invention technique involves electrolytically etching tungsten at constant potential in a borate phosphate or carbonate buffered electrolyte having a pH within the range of 7.0 to 10.5.

BRIEF DESCRIPTION OF THE DRAWING

The invention will be more fully understood by reference to the following detailed description taken in conjunction with the accompanying drawing wherein:

The figure is a schematic diagram of the apparatus used in the practice of the present invention.

DETAILED DESCRIPTION

With reference now more particularly to the figure, there is shown a container 11 having contained therein an electrolyte 12 selected from among the borates of sodium, potassium and ammonium. The pH of the electrolyte is maintained within the range of 7.0 to 10.5, such range being dicated by considerations relating to the rate of etching at the lower end and limitations imposed by photoresists at the upper end. Shown disposed within container 11 is a typical substrate member 13 comprising a semiconductor material such as silicon and the like. Disposed upon the substrate 13 is an insulating film 14 which may be selected from among any of the well-known insulators compatible with semiconductors. In the illustrative example, 14 represents a layer of silicon dioxide. A tungsten film 15 which it is desired to etch is shown deposited on insulating layer 14 and a photoresist 16 is shown selectively deposited upon tungsten 15. Electrical contact of film 15 is provided by means of a conventional contact 17, one end of which is connected to a potentiostat 18. Electrical contact with the electrolyte is provided by means of electrode 19, one end of which is connected to the other side of potentiostat 18 and reference electrode 20. A motor driven mechanism 21 is provided for the purpose of lowering the substrate into the electrolyte.

In the operation of the present invention, a difference of potential within the range of 0.2 to 0.5 volt with respect to the reference electrode (Hg/HgO) is applied between tungsten film 15 and electrolyte 19 by means of potentiostat 18. Ordinarily, the current generated thereby cannot satisfactorily etch a single metal layer on an insulating substrate due to the formation of isolated unetched islands. However, tungsten is unique in that the dioxide intermediate is a conductor and maintains continuity in the pattern. During the etching of the tungsten in accordance with the present invention, the formation of tungsten islands is avoided by selection of a suitable etching rate which is dictated by current density. The maximum current density, I, permissible in the practice of the invention is approximately 40 milliamperes/cm.$^2$. In the event this value is exceeded, the oxide intermediate is unable to maintain continuity in pattern and results in the formation of unetched islands. The time period for etching generally ranges from 2 to 10 minutes and may be conveniently calculated from the equation $$t=dDnF/IH$$

where $t$ equals time of etching, $d$ equals tungsten film thickness, D equals density of tungsten, $n$ equals the number of electrons transferred, F equals Faraday constant, I equals maximum current density and M equals molecular weight.

In practice, it is found convenient to maintain the desired conditions by lowering the material slowly through the solution as etching proceeds so that a maximum length of about 2 centimeters of unetched tungsten is in solution at all times.

Returning again to the illustration described above, etching is initiated by applying a potential difference between tungsten film 15 and electrolyte 12 by means of potentiostat 18. The D.C. source is adjusted so that the tungsten film 15 is relatively biased with respect to the reference 20 in electrolyte 12. A potentiostat 20 is employed to adjust the current density at the surface of the tungsten to a value within the range of 4 to 40 milliamperes/cm.$^2$.

The electrolytic etching continues to a point where the exposed tungsten is removed, this point being evidenced by an abrupt decrease in electrolytic current. At that point, the potentiostat is turned off and etching terminated.

An example of the present invention is set forth below. It will be understood by those skilled in the art that the example and the above-described illustrative example are merely for the purpose of exposition and are not restrictive in nature.

EXAMPLE

The substrate selected for use herein was a silicon wafer having a layer of silicon dioxide deposited thereon. The silicon slice was 1¼ inches in diameter and also had a 0.2 micron thick coating of tungsten deposited thereon. The electrolytic cell utilized was comprised of a platinum counterelectrode and a mercury-mercury oxide (30 percent KOH) reference. The slice to be etched was held by a titanium clip adapted to a rack and pinion slide which permitted the slide to be slowly lowered into the solution. The electrolyte was 0.1 molar ammonium tetraborate having a pH of 9.3. The electrical circuit employed included a potentiostat, a digital voltmeter and a chart recorder which was used to monitor potential and current, respectively. Approximately 25 percent of the slice was immersed into the solution and the potentiostat turned on and current observed. The current was initially about 8 milliamperes and as it decreased to 4 milliamperes the slice was lowered further into the solution until fully immersed. When the current dropped to 400 microamps the potentiostat was turned off. A photomicrograph of the etched example revealed that the edges were sloped and that etching occurred uniformly.

What is claimed is:

1. A technique for selectively removing portions of an electrically conductive tungsten film from a tungsten coated insulating substrate which comprises contacting said film with an electrolyte selected from the group consisting of the carbonates, borates and phosphates of sodium, potassium and ammonium, said electrolyte having a pH within the range of 7.0 to 10.5, and impressing a difference of potential with a maximum current density of 40 ma./cm.$^2$ across said film and said electrolyte, so resulting in the selective removal of portions of said tungsten film.

2. Technique in accordance with claim 1 wherein said substrate is silicon having a layer of silicon dioxide deposited thereon.

3. Technique in accordance with claim 2 wherein said electrolyte comprises ammonium tetraborate.

4. Technique in accordance with claim 3 wherein the pH of said electrolyte is 9.3.

References Cited

UNITED STATES PATENTS

| | | | |
|---|---|---|---|
| 1,958,338 | 5/1934 | Gwyn | 204—129.75 |
| 2,803,596 | 8/1957 | Brown | 204—129.75 |
| 3,560,357 | 2/1971 | Shaw | 204—129.75 |
| 3,575,825 | 4/1971 | Skoda | 204—129.75 |

TA-HSUNG TUNG, Primary Examiner

U.S. Cl. X.R.

204—129.75